United States Patent [19]

Tran

[11] Patent Number: 5,768,553
[45] Date of Patent: Jun. 16, 1998

[54] MICROPROCESSOR USING AN INSTRUCTION FIELD TO DEFINE DSP INSTRUCTIONS

[75] Inventor: Thang M. Tran, Austin, Tex.

[73] Assignee: Advanced Micro Devices, Inc., Sunnyvale, Calif.

[21] Appl. No.: 550,024

[22] Filed: Oct. 30, 1995

[51] Int. Cl.$^6$ .............................................. G06F 9/30
[52] U.S. Cl. ........................ 395/384; 395/561; 395/670
[58] Field of Search ............................ 395/384, 561, 395/800, 670; 364/715.04

[56] References Cited

U.S. PATENT DOCUMENTS

| | | | |
|---|---|---|---|
| 5,438,668 | 8/1995 | Coon et al. | 395/380 |
| 5,574,933 | 11/1996 | Horst | 395/800.28 |
| 5,644,755 | 7/1997 | Wooten | 395/500 |

FOREIGN PATENT DOCUMENTS

| | | |
|---|---|---|
| A 0 067 667 | 12/1982 | European Pat. Off. . |
| A 0 369 396 | 5/1990 | European Pat. Off. . |
| A 0 425 410 | 5/1991 | European Pat. Off. . |
| A 0 467 152 | 1/1992 | European Pat. Off. . |

OTHER PUBLICATIONS

IEEE Micro. vol. 13, No. 5, Oct. 1, 1993, pp. 24–36, XP000397921, Makoto Awaga Et Al: "The VP 64–Bit Vector Coprocessor: A New Implementation of High–Performance Numerical Computation".

*Programming the 80386* –John H. Crawford and Patrick P. Gelsinger –1987 Sybex, Inc. –pp. Including cover page, copyright page, and pp. 446–475.

*Primary Examiner*—Parshotam S. Lall
*Assistant Examiner*—Zarni Maung
*Attorney, Agent, or Firm*—Conley, Rose & Tayon; B. Noel Kivlin

[57] ABSTRACT

A microprocessor employing a DSP unit and an instruction decode unit is provided. The instruction decode unit is configured to detect an instruction field included with an instruction, and to dispatch instructions having the instruction field to the DSP unit. The DSP unit performs DSP functions, such as a multiply-accumulate function. In one embodiment, the inclusion of an instruction prefix field in an x86 instruction indicates that the instruction is a DSP instruction. In one particular implementation, the inclusion of a segment override prefix byte within the prefix field of an x86 instruction indicates that the instruction is a DSP instruction. Embodiments of the DSP unit may include a vector memory for storing operands. A block of operands may be stored into the vector memory prior to initiating a large number of DSP operations upon the block of operands.

14 Claims, 4 Drawing Sheets

5,768,553

1

MICROPROCESSOR USING AN INSTRUCTION FIELD TO DEFINE DSP INSTRUCTIONS

BACKGROUND OF THE INVENTION

1. Field of the Invention

This invention is related to the field of microprocessors and, more particularly, to a DSP unit included within a microprocessor for performing DSP functions.

2. Description of the Relevant Art

Microprocessor manufacturers continue to develop new products which execute x86 instructions in order to maintain compatibility with the vast amount of software developed for previous 80x86 generations—the 8086/8, 80286, 80386, and 80486. Maintaining software compatibility has forced many architectural compromises in newer products. In order to retain the functions of earlier products, hardware has often been simply modified or extended in order to increase capability and performance. One area that is often extended to increase capability and performance is the memory addressing model.

Early x86 microprocessors implemented a memory addressing model using segmentation. In segmentation, a memory address is specified by an instruction using two parts: a segment and an offset within the segment. This type of memory address may be referred to as a "virtual" or "logical" address. The segment selector is stored in a segment register and indicates where the segment is located in main memory (if the processor is running in unprotected mode) or points to a segment descriptor stored in a segment descriptor table in main memory. The segment descriptor contains information regarding the segment, including its base address. The base address is added to the offset to form the physical address. Each x86 instruction which has the ability to access memory has a default segment register from which it draws its segment data. The x86 architecture defines six segment registers: CS, DS, SS, ES, FS, and GS. CS is the default segment register used for code (instruction) storage. DS is the default segment register used for data accesses of instructions which do not manipulate stack values. For stack accesses, SS is the default segment register. ES is the default segment register used for string manipulation instructions. The default segment may be overridden in favor of another segment register for a particular instruction by adding a segment override prefix byte to the instruction.

Beginning with the 80386, special paging circuitry was added to the segmented address generation hardware to allow the implementation of paged memory systems. Programmers are developing operating systems which use paged memory systems. Paged memory systems offer the ability to load smaller portions of programs into main memory at any given time and provide additional built-in protection checking for programs running simultaneously. Additional information regarding the paging structure and segmentation in the x86 architecture may be found within the publication "Programming the 80386" by Crawford, et al., SYBEX, Inc., San Francisco, 1987. This publication is incorporated herein by reference in its entirety.

Memory segmentation is typically not used when implementing such paged memory systems upon microprocessors which implement 32 bit logical addressing. Memory segmentation cannot be "turned off," but may be effectively disabled through the use of a "flat" memory model made possible with the advent of 32 bit logical addressing. A flat memory model is created by making all segment registers

2 point to the same memory segment (i.e., making all memory segments overlap). This overlapping is accomplished by storing the same segment information in all segment registers. Programmers using the paging mechanism typically implement the flat memory model.

The flat memory model has a major impact on the utility of the segment registers. Holding redundant segment address information significantly reduces the utility of the two general purpose segment registers added with the 80286 microprocessor, i.e. the FS and GS segment registers. (The other segment registers are implicitly referenced by 80x86 instructions, but they contain redundant information under the flat memory model). A constructive use for explicit references to segment registers under the flat memory model is desired.

Computer systems employing x86 microprocessors often employ digital signal processors (DSPs). The DSPs are often included within multimedia devices such as sound cards, speech recognition cards, video capture cards, etc. The DSPs function as coprocessors, performing complex mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, impulse response (IR) filters, Fast Fourier Transforms (FFTs), matrix correlations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations.

As computer systems include more multimedia devices and capabilities, the mathematical computation performed within the computer system also increases. While computer systems have evolved to include multimedia functions, microprocessor performance has continued to increase. Still further, the number of transistors included within microprocessor designs continues to increase with continued improvements in semiconductor fabrication technology. It is desirable to integrate DSP functionality into the microprocessor, to handle the increased computational demands of modern computer systems.

SUMMARY OF THE INVENTION

The problems outlined above are in large part solved by a microprocessor employing a DSP unit and an instruction decode unit according to the present invention. The instruction decode unit is configured to detect an instruction field included with an instruction, and to dispatch instructions having the instruction field to the DSP unit. The DSP unit performs DSP functions, such as a multiply-accumulate function. Advantageously, the microprocessor may perform DSP functions. Computer systems employing the microprocessor may decrease cost by eliminating DSPs in favor of executing the signal processing functions within the microprocessor. In one embodiment, the inclusion of an instruction prefix field in an x86 instruction indicates that the instruction is a DSP instruction. In one particular implementation, the inclusion of a segment override prefix byte within the prefix field of an x86 instruction indicates that the instruction is a DSP instruction. For this particular implementation, a constructive use for the segment override prefix byte while the flat memory model is in use has been defined.

Other embodiments of the microprocessor define the use of segment override prefix bytes even in the absence of the flat memory model. More particularly, an embodiment of the microprocessor may dedicate a specific segment override prefix byte as an indication of a DSP instruction. For example, the FS or GS segment override prefix bytes may be dedicated for such indications. The FS or GS segment override may be ignored for purposes of data access by such instructions, or the segment may be used to define a DSP data segment. In another embodiment, a segment override prefix byte which specifies the default segment for the instruction may be used to indicate a DSP instruction.

Embodiments of the DSP unit may include a vector memory for storing operands. A block of operands may be stored into the vector memory prior to initiating a large number of DSP operations upon the block of operands. Advantageously, memory access delays may be eliminated from a repetitive sequence of mathematical operations to be performed by the DSP unit. The sequence of mathematical operations may be performed in consecutive clock cycles by the DSP unit, including reading the operands from the vector memory.

Broadly speaking, the present invention contemplates a microprocessor comprising a configuration register, an instruction decode unit, and DSP unit. The configuration register is configured to store an enable value. Coupled to the configuration register, the instruction decode unit is configured to detect an instruction field indicative of a DSP instruction. Furthermore, the instruction decode unit is configured to dispatch an instruction to a DSP unit according to the instruction field if the enable value indicates enabled. The DSP unit is coupled to receive the instruction from the instruction decode unit, and is configured to perform a DSP function in response to the instruction.

BRIEF DESCRIPTION OF THE DRAWINGS

Other objects and advantages of the invention will become apparent upon reading the following detailed description and upon reference to the accompanying drawings in which.

Figure 1:
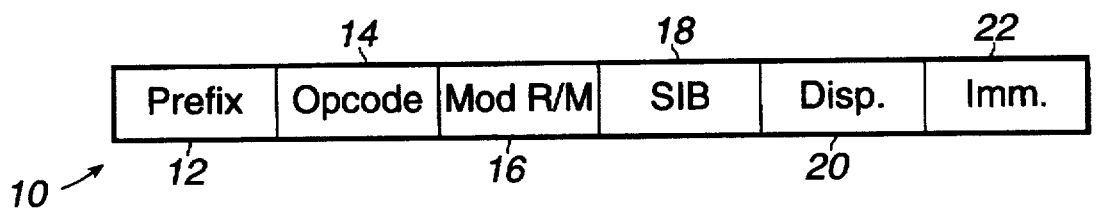
FIG. 1 is a diagram of an instruction having several instruction fields.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a diagram of the instruction fields within an x86 instruction is shown. An x86 instruction 10 may include several instruction fields: a prefix field 12, an opcode field 14, a MOD R/M field 16, an SIB field 18, a displacement field 20, and an immediate field 22. Opcode field 14 is included within each instruction, while the other fields are optionally included depending upon the desired instruction operation. As used herein, the term "instruction field" refers to one or more contiguous bits within an instruction. The bits are interpreted in a particular way by virtue of being included within the particular instruction field. For example, opcode field 14 includes bits which are encoded to define the operation the instruction is to perform.

Generally speaking, prefix field 12 may include one or more bytes which modify the operation of the instruction as specified by opcode field 14. Among the prefix bytes defined by x86 instructions is a set of segment override prefix bytes. One segment override prefix byte is assigned to each of the segment registers included in the x86 microprocessor architecture.

When the flat memory model is in use, segment override prefix bytes provide little utility. Therefore, segment override prefix bytes may be defined to change the operation of an instruction defined by the opcode to a significantly different instruction. In particular, DSP-type instructions may be created by redefining a presently defined x86 opcode when a segment override prefix byte is included in the instruction. In other words, a prefix instruction field is used to generate new instructions. Even when the flat memory model is not in use, it is contemplated that a specific segment override prefix byte may be used to indicate DSP instructions. For example, the FS or GS segment override bytes may be dedicated to indicating DSP instructions. The segment override may be ignored for purposes of accessing data by the instruction, or the segment may be used to define a DSP data segment. Additionally, a segment override prefix byte which specifies the default segment for the instruction may be used to indicate DSP instructions.

Opcode field 14 includes one to two bytes which define the instruction to be executed. An operand for the instruction may be specified by opcode field 14 as well. As previously mentioned, the operation of the instruction may be modified by prefix field 12. MOD R/M field 16 and SIB field 18 are optional fields which specify additional operands and addressing modes for the instruction. Displacement field 20 includes bytes forming a displacement field for use in address calculations. Displacement field 20 may comprise zero, one, two, or four bytes. Similarly, immediate field 22 may comprise zero, one, two or four bytes of immediate data. The immediate data may be used as an operand by instruction 10.

Figure 2:
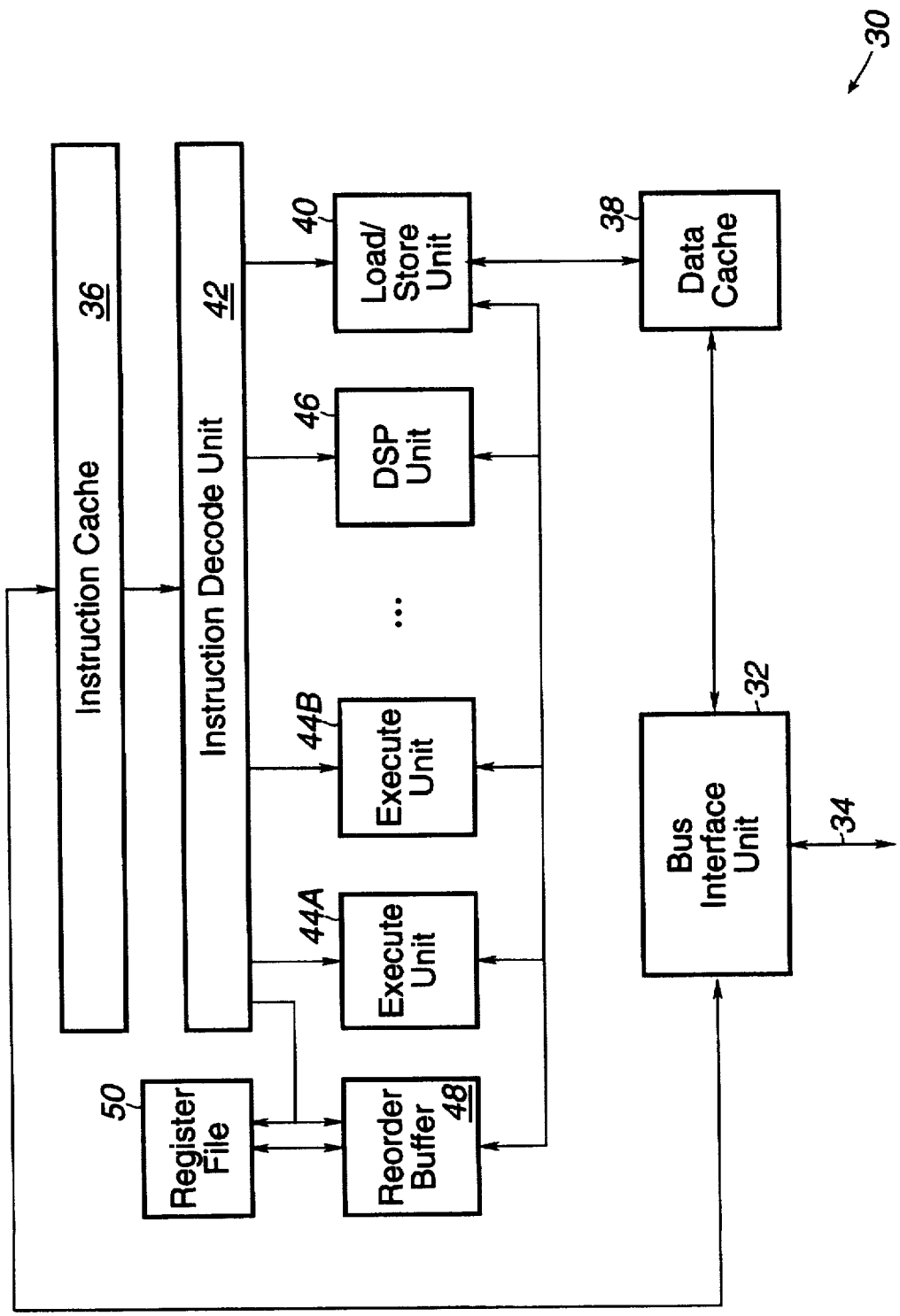
FIG. 2 is a block diagram of a microprocessor including an instruction decode unit and a DSP unit.

Turning now to FIG. 2, a block diagram of one embodiment of a microprocessor 30 is shown. Microprocessor 30 includes a bus interface unit 32 coupled to an external bus 34, an instruction cache 36, and a data cache 38. Data cache 38 is coupled to a load/store unit 40. Instruction cache 36 is coupled to an instruction decode unit 42, which is coupled to a plurality of execute units included execute units 44A and 44B (collectively referred to as execute units 44), a DSP unit 46, load/store unit 40, a reorder buffer 48, and a register file 50. DSP unit 46 is coupled to load/store unit 40. Execute units 44, DSP unit 46, and load/store unit 40 are coupled to reorder buffer 48.

Generally speaking, instructions are fetched from instruction cache 36 and conveyed to instruction decode unit 42 for decode, operand fetch, and dispatch. Instruction decode unit 42 decodes each instruction in order to determine which of execute units 44, DSP unit 46, or load/store unit 40 are configured to execute the instruction. Instruction decode unit 42 dispatches the instruction to a unit which is configured to execute the instruction and has resources to execute or store the instruction at the time the instruction is decoded. Additionally, register operands (i.e. operands stored in register file 50) are decoded from the instruction in order to convey operand requests to register file 50 and reorder buffer 48.

In particular, instruction decode unit 42 is configured in one embodiment to decode the prefix instruction field and the opcode field of the instruction. If the prefix instruction field includes a segment override prefix byte and the opcode field is one of the opcodes which is defined in conjunction with the segment override prefix byte to be a DSP instruction, then the instruction is dispatched to DSP unit 46. An exemplary listing of instructions and segment override prefix bytes which are defined as DSP instructions is given further below. As used herein, a DSP instruction is an instruction which performs a DSP function within DSP unit 46. A DSP function is a function which DSPs are typically optimized to perform, but which microprocessors are not typically optimized to perform. DSP functions may include highly optimized mathematical functions. For example, a multiply and accumulate function is a DSP function. DSPs often include a multiply and accumulate function which multiplies a pair of operands together and adds the product to a third operand. The third operand may maintain an accumulation of prior multiplications. The multiply and accumulate function is useful in many numerically intensive applications such as convolution and numerical integration. Additionally, DSPs are often optimized to repetitively operate upon a large number of operands stored contiguously in a memory. The memory may be accessed via a pair of pointer registers and the pointer registers may be incremented or decremented concurrently. Microprocessors, on the other hand, typically access a single memory value via an address and the source of the address is not updated. A separate instruction is often used to update the source of the address. Advantageously, microprocessor 30 may execute DSP functions more efficiently than was previously achievable. A computer system employing microprocessor 30 may reduce or eliminate the number of DSPs included in the system, and instead execute the corresponding processing functions upon microprocessor 30.

Instruction cache 36 is configured to store a plurality of lines of instructions prior to their execution by microprocessor 30. It is noted that instruction cache 36 may be configured in a set-associative or direct-mapped configuration. Multiple instructions are fetched from instruction cache 36 and conveyed to instruction decode unit 42 during a clock cycle. In one embodiment, instruction cache 36 includes an instruction fetching mechanism which selects fetch addresses for fetching instructions. The instruction fetch mechanism may fetch instructions subsequent to those fetched in a previous clock cycle. In addition, instructions may be fetched from the predicted target of a branch instruction. A branch prediction mechanism may be included within instruction cache 36 for performing branch prediction. Any branch prediction mechanism may be used by instruction cache 36. Finally, instructions may be fetched according to a mispredicted branch instruction or an exception detected by reorder buffer 48.

As noted above, instructions are decoded by instruction decode unit 42 for dispatch to execute units 44, DSP unit 46, and load/store unit 40. In one embodiment, execute units 44 are symmetrical execution units. Symmetrical execution units are each configured to execute a similar subset of the instruction set employed by microprocessor 30. For example, symmetrical execution units may each be configured to execute instructions within the x86 instruction set except for load/store memory operations and DSP instructions. In another embodiment, execute units 44 are asymmetrical execution units. Asymmetrical execution units are each configured to execute subsets of the instruction set employed by microprocessor 30, and the subset executed by one execution unit may differ from the subset executed by other execution unit. For example, execute units 44 may include one or more arithmetic logic units configured to execute integer arithmetic and logical instructions, one or more floating point units configured to execute floating point instructions, and a branch unit configured to execute branch instructions.

Load/store unit 40 is configured to execute load and store memory operations. Since load/store unit 40 performs load and store memory operations which access a memory address, load/store unit 40 is coupled to data cache 38. Additionally, load/store unit 40 detects memory dependencies between addresses accessed and modified by various instructions.

Execute units 44, DSP unit 46, and load/store unit 40 may each include one or more reservation stations for storing dispatched instructions prior to the execution of those instructions. One or more operands for an instruction may not be available, causing a delay in executing the instruction. Additionally, the unit may execute another instruction provided to the unit in a previous clock cycle, causing a delay in executing the instruction. Instructions remain in the reservation station until operands become available, at which time the instruction becomes eligible for execution. A second instruction which is subsequent to a first instruction in program order may execute out of order with the first instruction if the second instruction receives its operands prior to the first instruction. In another embodiment, a centralized reservation station circuit may be included in microprocessor 30. Instruction decode unit 42 dispatches instructions into the centralized reservation station circuit, which then dispatches instructions which have all required operands to an appropriate unit for execution.

Microprocessor 30 supports out of order execution. Reorder buffer 48 is included to ensure that instructions are executed such that they calculate the same results as when the instructions are executed entirely in order. Reorder buffer 48 provides dependency checking, register renaming, mispredicted branch recovery, etc. When an instruction is decoded and dispatched by instruction decode unit 42, temporary storage is allocated within reorder buffer 48 for the results of the instruction. A tag identifying the storage location is assigned to the instruction. It is noted that instructions are decoded and dispatched in program order, allowing reorder buffer 48 to allocate storage locations for each instruction in program order. Reorder buffer 48 therefore tracks the original program order of instructions, regardless of the order in which the instructions are actually executed in execute units 44, DSP unit 46, and load/store unit 40. For simplicity, execute units 44, DSP units 46, and load/store unit 40 will be collectively referred to herein as functional units.

For each instruction which utilizes register operands, a request is made by instruction decode unit 42 to reorder buffer 48 and register file 50 for the operand. If reorder buffer 48 is storing an instruction which updates the requested register, then reorder buffer 48 provides either: (1) the operand, if the operand has been produced via execution of the instruction, or (2) a tag identifying the reorder buffer location to store the operand, if the operand has not yet been produced. If reorder buffer 48 is not storing an instruction which updates the register, then the operand value is provided by register file 50. Register file 50 includes storage locations for storing the value of each register defined by the microprocessor architecture employed by microprocessor 30. It is noted that, when a functional unit transmits a result to reorder buffer 48, the tag identifying the instruction being executed is also transmitted. The result is received by reorder buffer 48 and stored in the storage location indicated by the corresponding tag. Additionally, instructions which are within functional units or reservation stations awaiting the result may detect the tag conveyed to reorder buffer 48 and capture the result as it is conveyed. This technique is often referred to as "result forwarding". It is noted that, in cases where reorder buffer 48 is storing more than one update to a particular register, the tag or value associated with the last instructions (in program order) is conveyed in response to the request.

Reorder buffer 48 retires instructions (i.e. stores the results into register file 50 and deletes the instructions) in program order. An instruction may be retired when each instruction within reorder buffer 48 which is prior to that instruction in program order has been executed and is ready for retirement. In this manner, instructions which are speculatively executed and later found to be incorrectly executed may be discarded prior to updating register file 50. For example, an instruction may be subsequent to a branch instruction. If the branch instruction is found to be mispredicted via execution of the branch instruction by a functional unit, then the subsequent instruction may be part of a code sequence which is not intended to be executed. Because the instruction has not updated register file 50, it may be discarded from reorder buffer 48 and the instruction will appear to have never executed. Instructions subsequent to an instruction which causes an exception may be handled similarly. It is noted that instructions which include a store memory access may not update register file 50, but do not perform their store memory accesses until the instructions are otherwise ready for retirement in reorder buffer 48. In one embodiment, reorder buffer 48 conveys tags of instructions including a store memory access which are ready for retirement to load/store unit 40. Load/store unit 40 then performs the corresponding store memory accesses and the instructions may be retired.

Data cache 38 is a high speed cache memory configured to store data accessed by microprocessor 30. It is noted that data cache 38 may be configured as a set-associative or direct-mapped cache.

Bus interface unit 32 is included to effect communications between microprocessor 30 and other devices within a computer system employing the microprocessor. The other devices may be coupled to external bus 34, or coupled to another device or devices which are coupled to external bus 34. In particular, instruction cache 36 communicates instruction fetch addresses which miss instruction cache 36 to bus interface unit 32. Similarly, data addresses which miss data cache 38 are conveyed to bus interface unit 32. Bus interface unit 32 is configure to communicate the addresses to a main memory upon external bus 34, and to convey the data or instructions received to data cache 38 and instruction cache 36, respectively. Still further, bus interface unit 32 receives cache lines discarded from data cache 38 which have been modified with respect to main memory. Bus interface unit 32 transfers such cache lines to main memory via external bus 34.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377,843, filed Jan. 25, 1995 by Witt, et al. The disclosures of these patent applications are incorporated herein by reference in their entirety.

Figure 3:
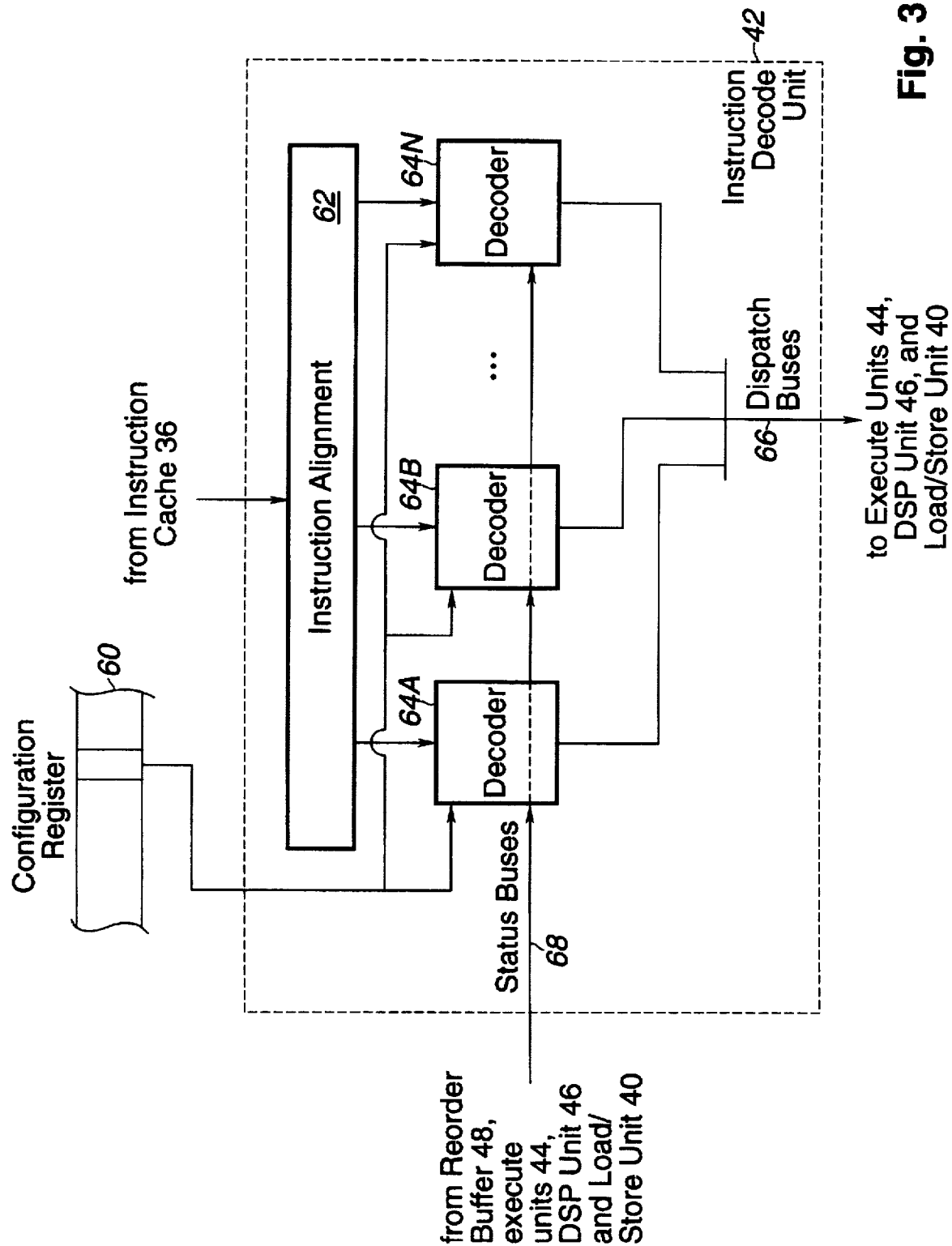
FIG. 3 is a block diagram of the instruction decode unit shown in FIG. 2.

Turning now to FIG. 3, a block diagram of one embodiment of instruction decode unit 42 is shown. Also shown in FIG. 3 is a configuration register 60. Configuration register 60 stores an enable value which indicates whether or not microprocessor 30 is configured to execute DSP functions. If the enable value indicates enablement, then instruction decode unit 42 decodes instructions including a prefix field comprising a segment override prefix byte as DSP instructions. If the enable value indicates disablement, then DSP instructions are not detected by instruction decode unit 42. Instead, the definition of the instructions under the x86 microprocessor architecture is used. In one embodiment, configuration register 60 comprises the CR0 register defined by the x86 microprocessor architecture, and the enable value comprises the paging enable bit. It is assumed, therefore, that is paging is enabled then the flat memory model is being used in this embodiment. Other embodiments may enable or disable DSP functionality for other purposes. For example, software may choose to enable or disable DSP functionality according to the program being executed.

In the embodiment of FIG. 3, instruction decode unit 42 includes an instruction alignment unit 62 coupled to a plurality of decoder circuits 64A-64N (collectively referred to as decoder circuits 64). Each of decoder circuits 64 decodes an instruction received from instruction alignment unit 62 and dispatches the instruction with an indication of which functional unit is to receive the instruction. The dispatched instructions are conveyed upon a plurality of dispatch buses 66 coupled to the functional units. A plurality of status buses 68 from each of the functional units and reorder buffer 48 indicate the respective status of the units (i.e. the number of instructions which the unit may accept during the clock cycle). The status of each unit and indications of the instructions decoded by each unit may be used to determine stall conditions. For example, if two decoder circuits 64 decode a DSP instruction and the status of DSP unit 46 is such that only one instruction may be accepted, then the second DSP instruction (in program order) and subsequent instructions are stalled until the second DSP instruction is dispatched.

Instruction alignment unit 62 is configured to distribute variable-byte length instructions to decoder circuits 64. In one embodiment, instruction alignment unit 62 includes a byte queue in which instruction bytes fetched from instruction cache 36 are queued. Instruction alignment unit 36 locates valid instructions from within the byte queue and dispatches the instructions to respective decoder circuits 64. In another embodiment, instruction cache 36 includes predecode circuitry which predecodes instruction bytes as they are stored into instruction cache 36. Start and end byte information indicative of the beginning and end of instructions is generated and stored within instruction cache 36. The predecode data is transferred to instruction alignment unit 62 along with the instructions, and instruction alignment unit 62 transfers instructions to the decoder circuits 64 according to the predecode information. Instruction alignment unit 62 may be configured similar to the disclosure of the commonly assigned, co-pending patent application entitled: "A High Speed Instruction Alignment Unit for a Superscalar Microprocessor", Ser. No. , filed Apr. 12, 1995 by Johnson, et al. The disclosure of this patent application is incorporated herein by reference in its entirety.

As noted above, decoder circuits 64 are configured to detect DSP instructions if the enable value in configuration register 60 indicates that DSP instruction detection is enabled. Table 1 below shows an exemplary set of DSP instructions and the segment override prefix byte and x86 instruction which is decoded as each DSP instructions. In one embodiment, decoder circuits 64 include circuits configured to detect the instructions shown in Table 1 and to dispatch such instructions to DSP unit 46.

Figure 4:
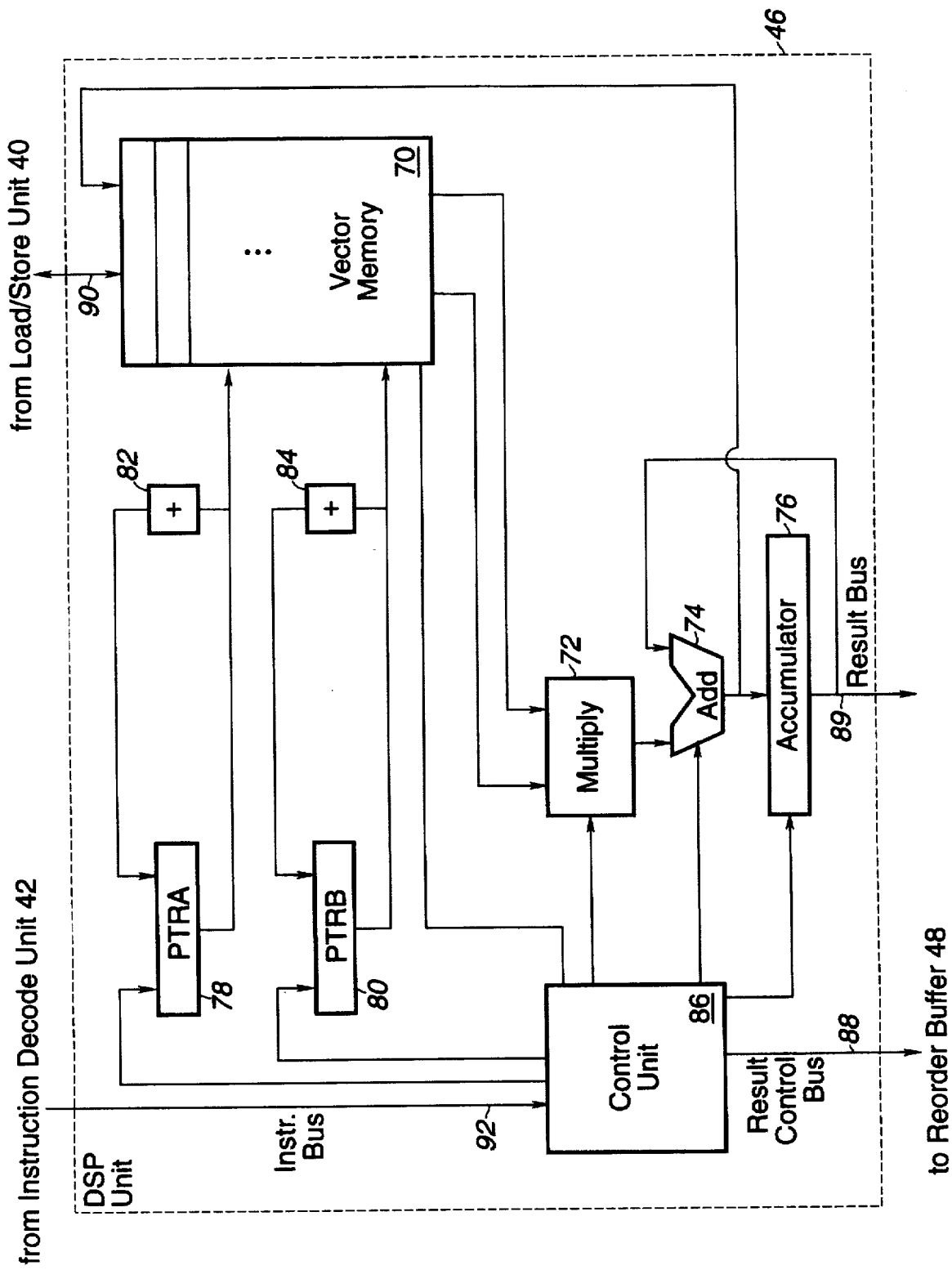
FIG. 4 is a block diagram of the DSP unit shown in FIG. 2.

Turning now to FIG. 4, a diagram of one embodiment of DSP unit 46 is shown. DSP unit 46 includes a vector memory 70, a multiplier 72, an adder 74, an accumulator register 76, a PTRA register 78, a PTRB register 80, a pair of incrementors 82 and 84, and a control unit 86. Control unit 86 is coupled to each other element of DSP unit 46 as well as to a result control bus 88. Vector memory 70 receives a data transfer bus 90 from load/store unit 40 upon a read/write port, and includes a pair of read ports coupled to PTRA register 78 and PTRB register 80. Incrementors 82 and 84 receive the pointer values stored in PTRA register 78 and PTRB register 80, respectively. Incrementors 82 and 84 return incremented pointer values to PTRA register 78 and PTRB register 80, respectively. Values read from pointer memory 70 according to PTRA register 78 and PTRB register 80 are conveyed to multiplier 72, which conveys a result indicative of the multiplication of the values to adder 74. Adder 74 is additionally coupled to accumulator 76 and conveys a result to accumulator 76. The output of adder 74 is further coupled to vector memory 70. An instruction bus 92 is coupled between control unit 86 and instruction decode unit 42 (or a reservation station coupled between instruction decode unit 42 and control unit 86).

DSP unit 46 is configured to perform DSP functions. In this particular embodiment, for example, DSP unit 46 is configured to multiply a pair of operands stored in vector memory 70, and to add or subtract the multiplicative result to the value stored in accumulator register 76. Advantageously, DSP unit 46 performs the multiply and accumulate function which DSPs are often configured to perform. Additionally, a large number of operands are available to DSP unit 46 via vector memory 70. Therefore, multiple multiply and accumulate instructions may be performed consecutively without incurring memory delays. It is noted that DSP unit 46 may be configured to perform floating point or integer calculations.

Control unit 86 is configured to control DSP unit 46 according to an instruction received upon instruction bus 92. An exemplary set of instructions supported by one embodiment of DSP unit 46 is given in Table 1. Explanations of the instructions follow.

TABLE 1

DSP instructions and Corresponding x86
Instructions and Segment Override Prefix Bytes

| DSP Instruction | x86 Instruction | Prefix Byte |
| --- | --- | --- |
| Multiply-Add | FMULP, FMUL | FS, GS |
| Multiply-Subtract | FMULP, FMUL | SS, DS |
| Multiply | FMULP, FMUL | ES, CS |
| Load Vector Memory | FLD | CS, DS, ES, SS |
| Store Vector Memory | FST | CS, DS, ES, SS |
| Load Accumulator | MOV | FS, GS |
| Store Accumulator | MOV | ES, SS |
| Load PTRA | MOV | DS |
| Load PTRB | MOV | CS |

The multiply-add, multiply-subtract, and multiply instructions are each specified via use of a different segment register and the FMULP or FMUL x86 instruction. Upon receipt of the multiply-add instruction, control unit 86 asserts control signals to multiplier 72 and adder 74. The control signals cause values pointed to by PTRA register 78 and PTRB register 80 to be multiplied and the product added to the contents of accumulator register 76. The result is then stored in accumulator 76 (if the FMULP instruction is used) or the vector memory location pointed to by PTRA register 78 (if the FMUL instruction is used). If a vector memory location is the destination of the instruction, a write enable signal is asserted by control unit 86 to vector memory 70. The write enable signal causes vector memory 70 to store the value conveyed from adder 74 into the memory location pointed to by PTRA register 78. Additional write enable signals are coupled between control unit 86 and vector memory 70, as will be described further below. Similarly, the receipt of the multiply-subtract and multiply instructions cause multiplier 72 to form a product. However, for the multiply-subtract form of the instruction the product is subtracted from the contents of the accumulator. For the multiply instruction, adder 74 is disabled via a control signal from control unit 86 and the product is passed through to be stored in either vector memory 70 or accumulator register 76.

The multiply-add, multiply-subtract, and multiply instructions may also specify that the values in PTRA register 78 and PTRB register 80 are incremented. If the GS, DS, or CS segment register override prefix bytes are included for the respective instructions, then control unit 86 causes the PTRA and PTRB registers to store the outputs of incrementors 82 and 84, respectively. PTRA and PTRB register updates occur after the respective values are accessed within vector memory 70 and after the result is written to vector memory 70, if the result is to be stored therein.

The load vector memory instruction is formed from the FLD x86 instruction and one of several segment override prefix bytes. The load vector memory instruction causes a block of memory comprising a plurality of bytes stored in contiguous memory locations to be transferred to vector memory 70. An address identifying the block of memory is formed in accordance with the MODR/M field and SIB field of the FLD instruction, as with other x86 instructions. The segment override prefix byte included within the load vector memory instruction identifies the storage locations within vector memory 70 which are to store the block of memory. In one embodiment, vector memory 70 comprises storage locations configured to store four blocks of memory. In one embodiment, a block of memory comprises a cache line of 32. A write enable signal coupled between control unit 86 and vector memory 70 is included for each block of memory within vector memory 70, and one of the write enable signals is asserted dependent upon the segment override prefix byte included with the instruction. Upon assertion of a corresponding write enable signal, storage locations within vector memory 70 comprising storage for the block of memory are updated with the bytes received upon data transfer bus 90. It is noted that vector memory 70 may comprise an array of random access memory (RAM) storage locations.

In one embodiment, the CS register specifies a first block of memory within vector memory 70; the DS register specifies a second block of memory within vector memory 70; the ES register specifies a third block of memory within vector memory 70; and the SS register specifies a fourth block of memory within vector memory 70. For this embodiment, vector memory 70 produces 32 bit operands for multiplier circuit 72. Therefore, each block of memory stores up to eight operands. The operands stored within the first block of memory are identified by values in the pointer registers ranging between zero and seven, the operand stored in the second block of memory by values ranging between eight and fifteen, etc. Therefore, PTRA register 78 and PTRB register 80 comprise 6 bit registers for accessing each of the eight operands within each of the four blocks of memory. It is noted that the block of memory is received from load/store unit 40 upon data transfer bus 90.

Because vector memory 70 may store the results of executing instructions within DSP unit 46, a store vector memory instruction is included. The store vector memory instruction causes a block of memory within vector memory 70 to be stored into data cache 38 at an address defined by the operands of the FST instruction, similar to the load vector memory instruction. The segment override prefix bytes are interpreted as define above for the load vector memory instruction. The block of memory is transferred to load/store unit 40 for storage upon data transfer bus 90.

It is noted that the load vector memory and store vector memory instructions are dispatched to both DSP unit 46 and load/store unit 40. Additionally, the load vector memory instruction and the store vector memory instruction are executed simultaneously by DSP unit 46 and load/store unit 40. For example, reservation station locations coupled to load/store unit 40 and DSP unit 46 may communicate before dispatching the instruction to DSP unit 46 and load/store unit 40 to ensure that the instruction is dispatched simultaneously to the units.

In another embodiment, the load vector memory and store vector memory instructions cause data to be transferred to and from main memory, without accessing data cache 38. Such an embodiment may be employed in cases in which DSP unit 46 operates upon data which other units of microprocessor 12 do not operate upon.

The contents of accumulator register 76 may be transferred to or from a register in register file 50 or a memory location using the load and store accumulator instructions. In one embodiment, accumulator register 76 comprises 64 bits for storing integer multiplication results. Such an embodiment utilizes two registers or 32 bit memory locations to store or retrieve the accumulator value. Therefore, the high order half of the accumulator is stored or retrieved upon detection of the ES and FS segment override prefix bytes, respectively. The low order half of the accumulator is stored or retrieved upon detection of the SS and GS segment override prefix bytes, respectively. An embodiment of DSP unit 46 which performs floating point operations may employ a 32 bit accumulator register 76, since 32 bit floating point operands produce a 32 bit floating point result. The floating point embodiment may therefore utilize a single load accumulator encoding and a single store accumulator encoding. It is noted that the present embodiment supports 32 bit transfers between DSP unit 46 and register file 50. Other embodiments may support 8 or 16 bit transfers. More encodings would be used for the load and store accumulator instructions for such embodiments.

Upon receipt of a store accumulator instruction, control unit 86 asserts control signals upon result control bus 88 indicative that a valid result is conveyed by DSP unit 46 during the clock cycle. The high or low half of the accumulator is driven onto a result bus 89 coupled to accumulator register 76, dependent upon the instruction received. For the load accumulator instruction, control unit 86 receives the value to be placed into accumulator register 76 upon instruction bus 92. The value is stored into accumulator register 76 under the control of control unit 86. It is noted that the destination operand for the store accumulator instruction and the source operand for the load accumulator instruction are specified according to the underlying x86 instruction.

PTRA and PTRB registers 78 and 80 are initialized to point to operands within vector memory 70 prior to executing a set of multiply-add, multiply-subtract, or multiply instructions. The load PTRA and load PTRB instructions are provided for this purpose. Upon receipt of a load PTRA or load PTRB instruction with an operand value, control unit 86 stores the low order 6 bits of the operand value into the indicated register. Operands may then be read from pointer memory 70 in order to multiply and accumulate the desired operands. It is noted that the source operand for the load PTRA and load PTRB instructions are specified according to the underlying x86 instruction.

It is noted that DSP unit 46 may be pipelined such that multiple operations are performed concurrently. Pipelining may enable DSP unit 46 to be operated at a higher clock frequency while still performing the multiply-accumulate function at a rate of one per clock cycle.

It is further noted that other exemplary sets of DSP instructions are contemplated. For example, additional x86 instructions may be used to define DSP instructions, such that only the FS and/or GS segment override prefix bytes are employed to identify the DSP instructions. Instead of dedicating the FS and/or GS segment override prefix bytes to indicating DSP instructions, yet another exemplary instruction set may use a segment override prefix byte which specifies the default segment of the instruction to define DSP instructions. Still further, segment override prefix bytes may be included within consecutive multiply and add instructions to indicate that the two instructions may be performed by DSP unit 46 as a single multiply-add operation.

As an example DSP function which may be performed by DSP unit 46, a sequence of x86 instructions for calculating the inner product of two vectors is shown in Table 2 below. An inner product of two vectors is the sum of each value within the first vector multiplied by a corresponding value in the second vector. For example, a vector may contain three elements indicative of displacement of the vector in the x, y, and z directions of a three-dimensional plane. If the elements of the first vector are represented as $V_x$, $V_y$, and $V_z$ and the elements of the second vector are represented as $W_x$, $W_y$, and $W_z$, then the inner product is represented by the equation:

Inner product=$V_xW_x+V_yW_y+V_zW_z$

If the elements of a pair of vectors are stored in respective blocks of memory, then the code shown in Table 2 computes the inner product of the two vectors.

TABLE 2

Inner Product, x86 code

| Instruction | Comment |
| --- | --- |
| MOV ECX, num_elements | ECX = number of elements in vectors |
| MOV ESI, addr1 | ESI = address of first element of first vector |
| MOV EDI, addr2 | EDI = address of first element of second vector |
| MOV EAX, 0 | EAX = index into first vector |
| MOV EBX, 0 | EBX = index into second vector |
| FLDZ | zero the accumulated result |
| AGAIN: FLD [ESI + EAX*4] | load element of first vector |
| INC EAX | increment to next element |
| FLD [EDI + EBX*4] | load element of second vector |
| INC EBX | increment to next element |
| FMULP ST(1), ST | multiply elements |
| FADDP ST(1), ST | add multiplication to accumulated result |
| DEC ECX | Decrement element counter |
| JNE AGAIN | Repeat if more elements |

The last eight instructions comprise the loop in which the inner product is calculated. Eight memory accesses are performed by the loop (two for the floating point loads, and each floating point instruction accesses two stack memory operands and stores a result on the stack). Additionally, two instructions are required to perform the multiply and accumulate function. Using the instructions executed by DSP unit 46, the code sequence of Table 3 performs an inner product computation.

TABLE 3

Inner Product, DSP unit 46 Code

| Instruction | Comment |
| --- | --- |
| MOV ECX, num_elements | ECX = number of elements in vectors |
| Load PTRA, addr1 | PTRA = address of first element of first vector within vector memory 70 |
| Load PTRB, addr2 | PTRB = address of first element of second vector within vector memory |
| Load Vector Mem addr1 | first vector loaded into vector memory |
| Load Vector Mem addr2 | second vector loaded into vector memory |
| Load accumulator 0 | zero the accumulated result |
| AGAIN: multiply-add | multiply vector elements, add to accumulated result, and increment pointers |
| DEC ECX | Decrement element counter |
| JNE AGAIN | Repeat if more elements |

The routine using DSP unit 46 includes fewer instructions within the main loop. Additionally, the formerly serial operations of multiplying two vector elements and adding them to a third vector element are advantageously performed as a single operation. Still further, the memory references of the x86 program are replaced by references to vector memory 70 which may be performed more quickly than accesses to a larger cache.

The above description uses the x86 microprocessor architecture as an exemplary microprocessor architecture for employing the present invention. However, other microprocessor architectures may benefit from the present invention as well. Embodiments of the present invention for use with other microprocessor architectures are contemplated.

In accordance with the above disclosure, a microprocessor has been described which uses an instruction field to define instructions useful for performing DSP functions. Instructions are decoded by a decode unit within the microprocessor. If the decode unit detects an instruction useful for performing DSP functions, then the decode unit dispatches the instruction to a DSP unit. The DSP unit includes hardware configured to execute DSP functions efficiently, and thereby may accelerate the operation of DSP functions upon the microprocessor.

Numerous variations and modifications will become apparent to those skilled in the art once the above disclosure is fully appreciated. It is intended that the following claims be interpreted to embrace all such variations and modifications.

What is claimed is:

1. A microprocessor, comprising:

a configuration register configured to store an enable value for selecting either a flat memory address mode or a segmentation address mode;

an instruction decode unit coupled to said configuration register, wherein said instruction decode unit is configured to detect an opcode field and a second instruction field indicative of an instruction, and wherein said instruction decode unit is configured to dispatch said instruction to a DSP unit if said second instruction field is a first value and if said enable value indicates said flat addressing mode; and said DSP unit coupled to receive said instruction from said instruction decode unit, wherein said DSP unit is configured to perform a DSP function in response to said instruction.

2. The microprocessor as recited in claim 1, wherein said DSP unit comprises:

a multiply-add circuit configured to perform a multiplication of input operands and an addition of an accumulator operand, forming an output value;

an accumulator register coupled to said multiply-add circuit, wherein said accumulator register is configured to store said output value of said multiply-add circuit, and wherein said accumulator register is configured to supply said accumulator operand to said multiply-add circuit; and a control unit configured to control said multiply-add circuit and said accumulator register according to said instruction.

3. The microprocessor as recited in claim 2 wherein said DSP unit further comprises a vector memory configured to store said input operands, coupled to said multiply-add circuit.

4. The microprocessor as recited in claim 3 further comprising a load/store unit coupled to said DSP unit, wherein said load/store unit is configured to load a block of memory into said vector memory.

5. The microprocessor as recited in claim 3 wherein said DSP unit further comprises a pointer register coupled to said vector memory, wherein said pointer register is configured to store an address identifying a location within said vector memory.

6. The microprocessor as recited in claim 5 further comprising an incrementor coupled to said pointer register, wherein said incrementor is configured to increment said address upon reading said vector memory.

7. The microprocessor as recited in claim 1 wherein said second instruction field comprises a prefix instruction field.

8. The microprocessor as recited in claim 7 wherein said prefix instruction field comprises a segment override prefix byte.

9. The microprocessor as recited in claim 8 wherein said enable value comprises a paging enable bit indicative, when set, of enablement of a paging translation mechanism within said microprocessor.

10. The microprocessor as recited in claim 1 wherein said instruction decode unit comprises:

an alignment unit configured to align instructions to a plurality of instruction decoders; and said plurality of decoders coupled to receive said instructions from said alignment unit.

11. The microprocessor of claim 1, further comprising an execute unit, wherein said instruction decode unit is further configured to dispatch said instruction to said execute unit if said second instruction field is a second value and if said enable value indicates said flat addressing mode.

12. The microprocessor of claim 11, wherein said second instruction field is a prefix byte.

13. The microprocessor of claim 11, wherein said instruction decode unit is further configured to dispatch said instruction to said execute unit if said enable value indicates segmentation mode regardless of said second instruction field.

14. The microprocessor of claim 13, wherein said second instruction field selects a segment register during said segmentation mode for address calculation.

* * * * *